Jan. 16, 1962 F. BROUWER 3,017,552
PATTERN TRACER SERVOSYSTEM
Filed June 30, 1959 7 Sheets-Sheet 1

WITNESSES
INVENTOR
Frans Brouwer
BY
ATTORNEY

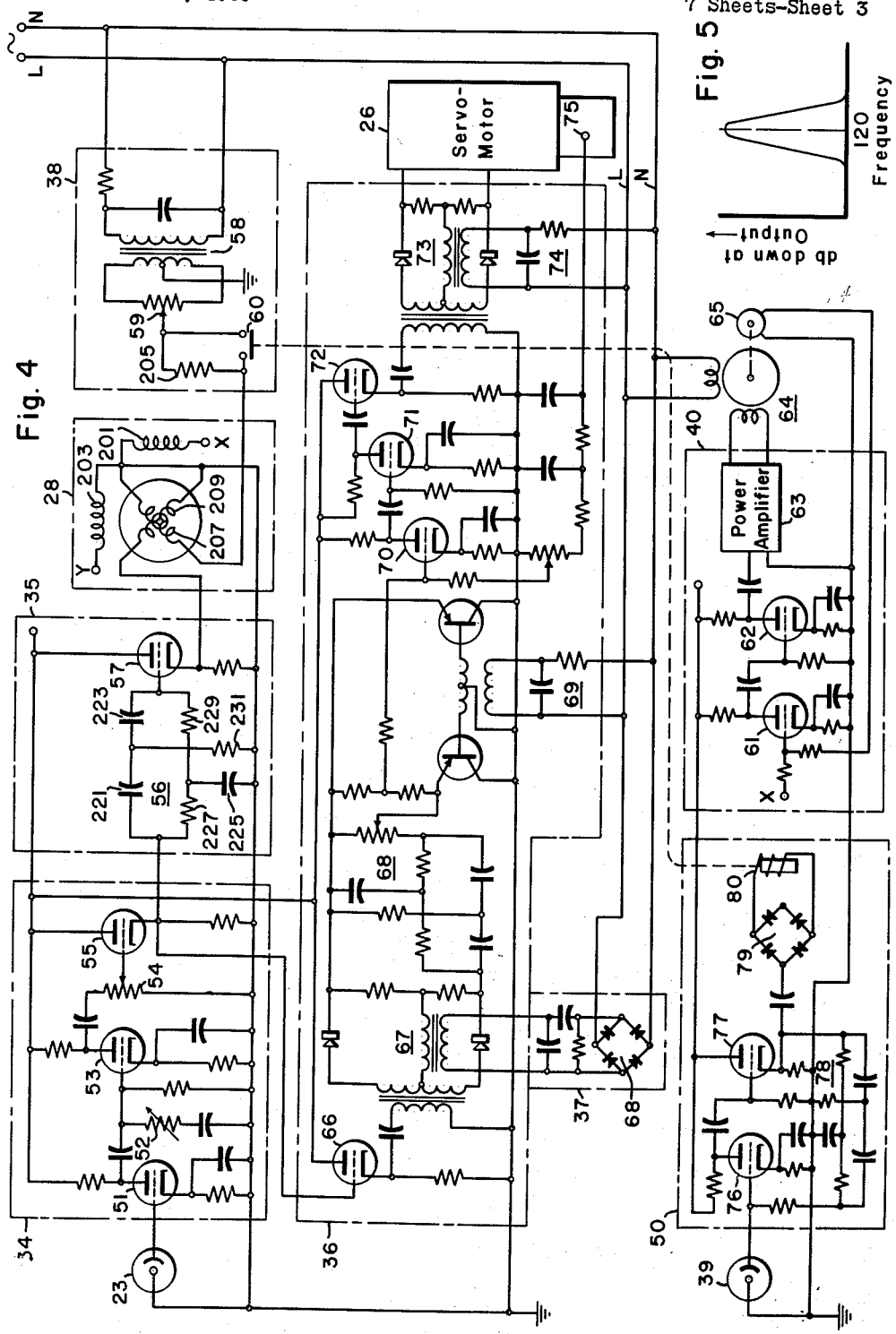

United States Patent Office 3,017,552
Patented Jan. 16, 1962

3,017,552
PATTERN TRACER SERVOSYSTEM
Frans Brouwer, Ancaster, Ontario, Canada, assignor to Canadian Westinghouse Company, Limited, Hamilton, Ontario, Canada
Filed June 30, 1959, Ser. No. 824,103
Claims priority, application Canada July 16, 1958
22 Claims. (Cl. 318—39)

This application is a continuation-in-part of Patent 2,933,668 granted April 19, 1960.

This invention relates to the tracer art and has particular relationship to apparatus for causing a tool such as a gas cutting torch or a milling cutter to follow a curve or a pattern and to a method of guiding the tool. As used in this specification the word "curve" means either a configuration drawn with a pencil, pen or the like on a web such as paper or under certain circumstances a solid template.

Automatic pattern following machines, which are intended to trace a curve by virtue of the difference in light transmission or reflection characteristics of the curve and the surrounding material have been proposed in accordance with the teachings of the prior art. One of the main disadvantages of such machines is their inability to follow the curve precisely and with the speed demanded in industry. For example, it may be desirable to cut out a pattern in a plate 10 feet long by following locally a curve having dimensions of the order of one foot. If the pattern is to be cut out with any reasonable precision, the tracer following the curve should operate highly precisely.

It is a principal object of this invention to provide tracer apparatus in the use of which a tool moving with the speed demanded by industry follows a curve precisely.

Another object of this invention is to provide a method for causing a tool to follow a curve precisely and at a reasonably high speed.

It has also been found that in the use of the prior art machines the tool is unable to follow rapidly and accurately discontinuities or even rapid changes in the curve. This has been due in part to the use of a mechanical device relating the tracing head with the line pattern, it having been usual for example to couple a mechanical driving wheel, driven at constant speed, directly or through a pantograph to the scanning head. Prior art attempts to eliminate the mechanical device have been unsuccessful. Another source of inaccuracy has been the use of scanning heads which in some degree are not concentric with the effective center of the work member, and which in fact lead the work member to reduce the possibility of ambiguity.

It is an object of this invention to provide a reliable automatic line tracer which can maintain a constant linear velocity without the use of mechanical contact drives.

It is a further object of this invention to provide a reliable optical automatic line tracer in which the scanning head can be optically concentric with the effective center of rotation of the work member.

In tracer operation a sensing element scans a curve usually by sensing back and forth about a center in a direction generally transverse to the curve while advancing generally along the curve. For any departure of the center of sensing from the center of the curve an error signal is produced dependent on the extent of departure. The error signal causes a correction to take place in the sensing element and the tool follows the sensing element, the same correction being applied to the tool also.

This invention in one of its principal aspects arises from the realization that the lack of precision in prior art apparatus resides in the connecting link between the error signal and the sensing element. For example, it has been proposed that the correction be effected by the proper firing of thyratrons or other discharge devices connected to produce selective motion but this requires that the discharge devices be precisely balanced and remain precisely balanced. This is not feasible.

It has been discovered in arriving at this invention that the error signal has a frequency pattern, that is, frequency components and a phase relationship, governed by the back and forth sensing of the sensing element and dependent on the departure of the center of sensing or scanning from the center line of the curve. In accordance with one aspect of this invention, this frequency pattern is used to provide corrections. With the center of sensing centered on the curve a signal is produced which has twice the sensing frequency. Departure of the center of sensing from the center of the curve in a direction transverse to the curve introduces into the signal a component having a frequency equal to the frequency of sensing and an amplitude dependent on the magnitude of departure. Angular displacement is measured by a displacement in phase of the signal of twice the sensing frequency.

In accordance with a principal aspect of this invention a restoring correction in a general direction transverse to the curve is produced so as to reduce the component of the error signal having a frequency equal to the sensing frequency to zero. In addition, the shift in phase of the double frequency component of the error signal is detected and the sensing is rotated to reduce this phase shift to zero.

Specifically if a curve is optically scanned by a point following a circular path of radius of the same order as the curve thickness and the reflected light received by the optical system converted into an electrical signal, the electrical signal will contain two components. One component will have the same frequency as the optical scan, and will have an amplitude representative of the perpendicular distance from the mechanical centre of the optical scan to the line. A second component will have a frequency twice the frequency of optical scanning, and will have a phase dependent upon the angle between a tangent to a point on the portion of the curve being scanned, and a reference line angularly fixed relative to the optical scanning mechanism. In accordance with this invention, the second component is utilized in a servo control system, to maintain the reference line in the scanning mechanism parallel to the tangent to the portion of the line being scanned. Simultaneously, the first component is added vectorially to coordinate drive signals to cause the mechanical centre of the optical scan to move in a direction to minimize the perpendicular distance to the line.

So that the filtering and phase detection may be effective in this mode of operation it is desirable that the error signal be at least approximately sinusoidal. In accordance with another aspect of this invention the dimensions of the sensing area on the curve, the width of the curve and the swing of the sensing element are so related that a substantially sinusoidal error signal or an error signal made of sinusoidal components is produced.

In accordance with a further aspect of this invention the curve is sensed in advance of the sensing which produces the normal error signal. This advance sensing responds to a substantial departure of the sensing means from the curve as would occur for a sharp bend in the curve and reduces the speed of the advance generally along the curve. The speed of the tool is correspondingly reduced and excessive departure of the tool from the line which would produce the desired pattern is thus avoided.

A specific embodiment of the present invention will now be described, by way of example, with reference to the accompanying diagrammatic drawings, wherein:

FIG. 4 is schematic of the electrical circuit for the scanning unit;

FIG. 5 is a graph showing the filter characteristics of a filter in the scanning unit;

Figure 1:
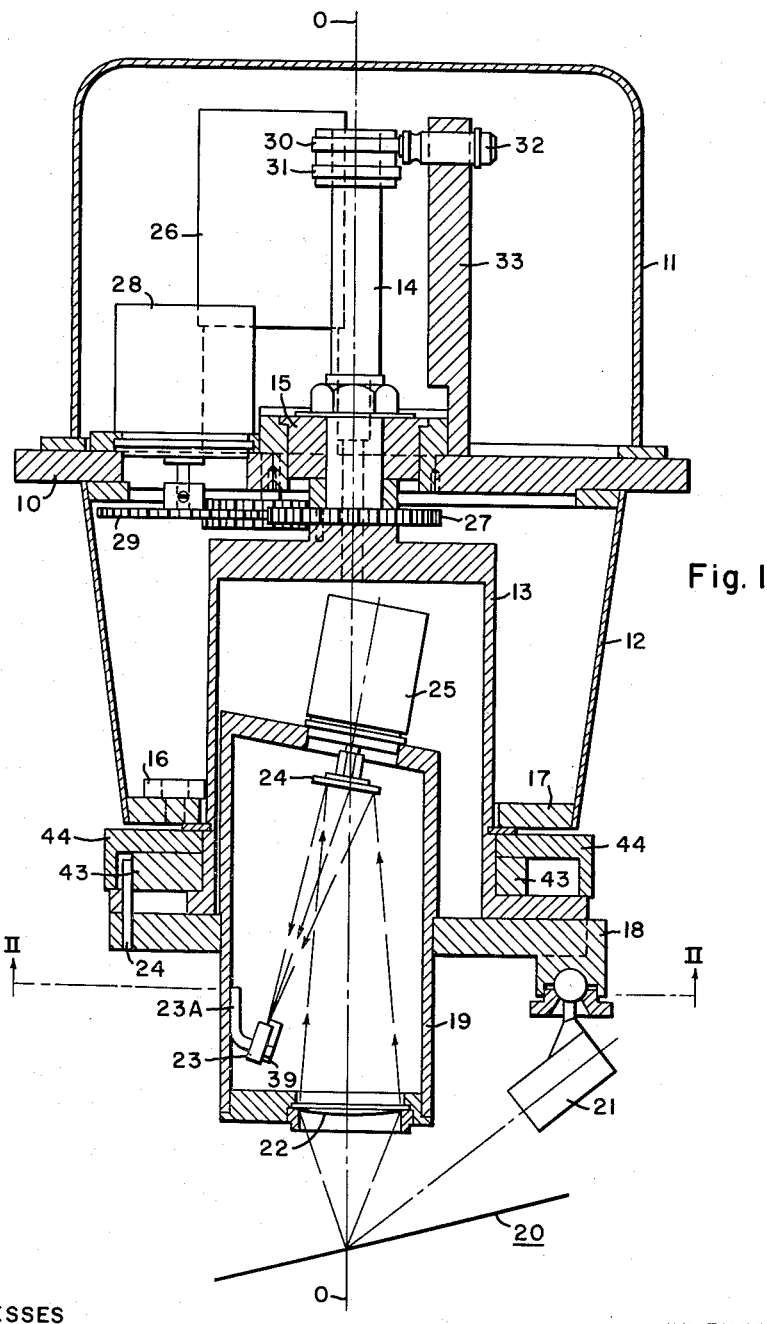
FIGURE 1 is a view in longitudinal section of the scanning unit.

The scanning head of the scanning unit comprises a support plate 10 to which upper and lower casings 11 and 12 respectively are removably secured. A tubular body 13 having a shaft 14 extending from its upper end is suspended by a bearing 15 from the plate 10. The outer periphery of the body 13 is circular and is engaged by three wheels 16 (only one shown) mounted on a plate 17 carried by the lower casing 12, the wheels permitting the body 13 to rotate freely while maintaining its axis of rotation coincident with the longitudinal axis O—O of the scanning unit. A slide 18 (whose function will be described below) moves freely but with minimum play in a dovetail-section slot in the lower end of the body 13. The slide carries a cylindrical body 19 whose longitudinal axis is parallel to, but not necessarily coincident with, the longitudinal axis O—O.

A curve 20 to be traced by the scanning unit is represented in FIGURE 1 below the head, the slide 18 carrying a spotlight 21 for illuminating the particular area of the drawing being scanned by the head. The mounting of the spotlight on the slide is by a releasable ball and socket joint so that its position can be changed to direct the light beam as required. An optical system for scanning a spot in a circular path comprises a fixed lens 22, a fixed photocell 23 and a rotatable mirror 24 mounted on the shaft of a motor 25 that is fixed to the body 19. The axis of rotation of the motor shaft bisects the angle between the optical axes of the lens and the photocell and the mirror is inclined at a small angle to the said axis of rotation (too small to be illustrated).

Figure 9:
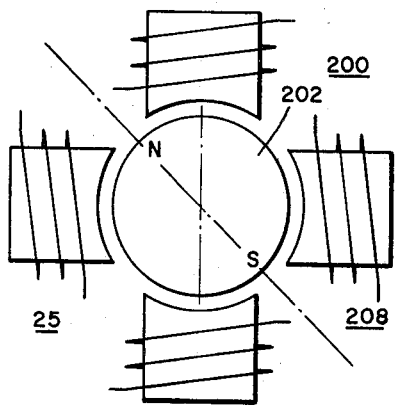
FIGS. 9 and 10 are diagrammatic views showing the scanning motor used in the practice of this invention.
Figure 11:
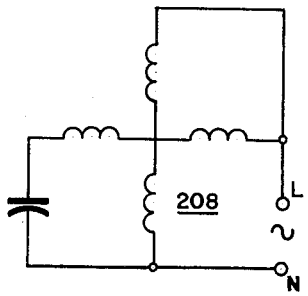
FIG. 11 is a schematic showing the supply circuit for the scanning motor.
Figure 10:
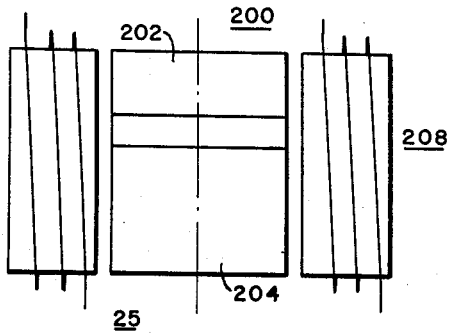

The motor 25 is of the phase-synchronous type. A phase-synchronous motor may be defined as a motor or other driving mechanism energizable from an alternating current supply and having a rotor element which moves repeatedly through 360°, each physical position of the rotor referred to a reference line having an angular displacement from the reference line which corresponds at all times to the same phase angle of the waves of the alternating supply. A typical motor of this type is shown in FIGS. 9 and 10 and the circuit in which it is connected is shown in FIG. 11. The motor 25 is characterized by a rotor 200 which is made up of a permanent magnet portion 202 and a hysteresis portion 204. The field 208 of the motor 25 may be supplied in quadrature as shown in FIG. 11. In situations in which the motor 25 may readily be started by spinning the motor 25 by hand the hysteresis portion of the rotor may be omitted and the rotor may be a permanent magnet throughout. The lower portion of the rotor may also be a squirrel cage rather than a hysteresis portion.

The rotor of the phase-synchronous motor 25 has during starting and during operation instantaneous positions bearing a fixed relationship to the waves of the supply. Thus a reference potential may be derived from the supply the phase points of the waves of which correspond to rotor positions.

The scanning head of this embodiment is kept accurately on the line being traced by displacing the whole head to maintain the axis of the scanned circle in the center of the line, and by rotating the optical system to maintain a reference line thereof tangential to the part of the line being scanned. The displacement of the whole head is effected by X- and Y-coordinate motors (see FIGURE 3) mounted with the head by a supporting frame (not shown). The rotation of the body 13 and the associated optical system is effected by a geared servomotor 26 (FIGS. 1 and 3) mounted on the plate 10 and driving a gearwheel (not seen in FIGURE 1) that meshes with another gearwheel 27 fast with the shaft 14. A resolver 28 is also mounted on the plate 10 and has a gearwheel 29 meshing with the wheel 27, the velocity ratio of the wheels 27 and 29 being 1:1. The output of the resolver 28 is thus determined in part by the angular setting of the scanning head by motor 26. Since the output of the resolver controls the X and Y motors, the latter are also controlled in part in accordance with the angular setting of the scanning head.

The X and Y motors also control the tool through the tool control so that the tool follows the scanning head and thus follows the curve 20.

Electric power for driving the motor 25 is supplied by means of slip rings 30 and 31 engaged by respective brushes such as 32 carried by a strut 33 mounted on the support plate 10. The photocell 23 is carried by a bracket 23A and is adjustable in its position thereon to enable it to be located accurately in the optical path.

The line to be traced may be of relatively high or low reflectivity, as compared with the surface on which it is drawn, and as the spot "seen" by the photocell intersects the line there will be a substantial change in the amount of light received by the photocell and a corresponding change in the output of the photocell. The thickness of the line is made such in relation to the size of the spot (or vice versa) that when the head is accurately disposed over the line the output of the photocell 23 is at least approximately a sine wave of frequency equal to twice the reference frequency of the unit, which conveniently is the frequency of the electric power supply usually 60 cycles per second.

Figure 6:
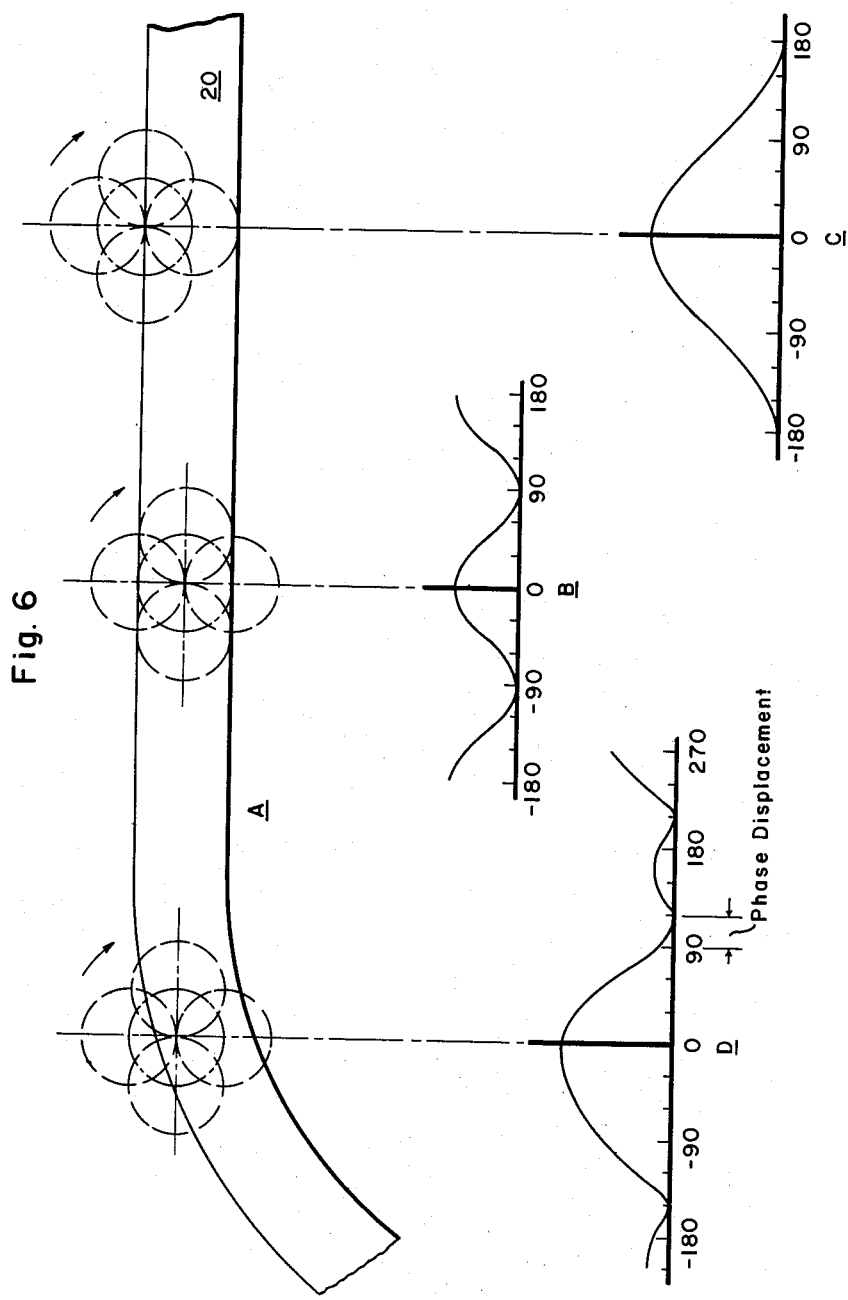
FIGS. 6, 7, 8 show waveforms of the error signal for different relationships of the thickness of the curve being scanned and the sensing area and the scanning swing to illustrate an important feature of this invention.
Figure 7:
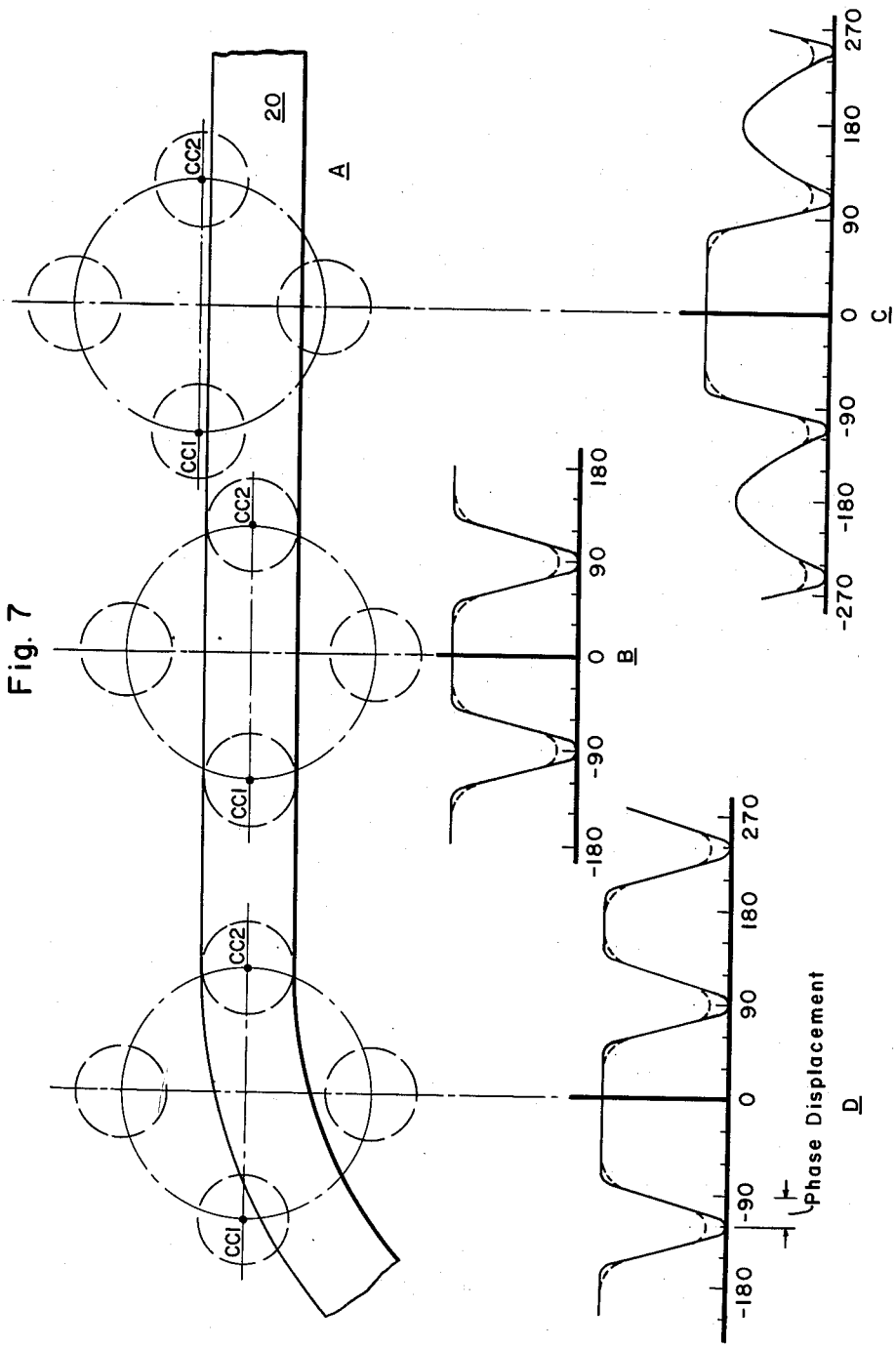
Figure 8:
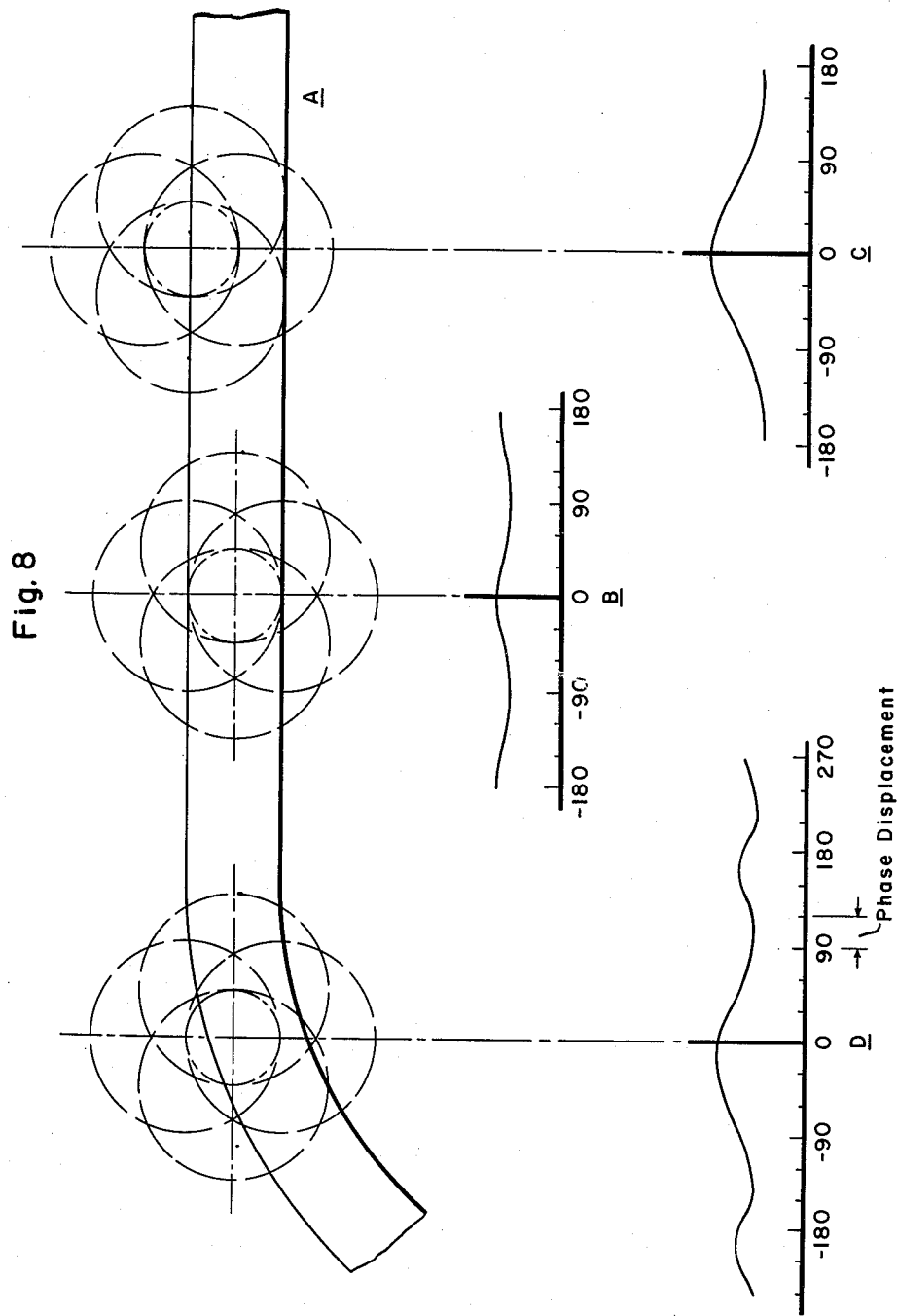

To illustrate the features of the invention involved here various relationships of the curve thickness, spot area and spot swing are shown in FIGS. 6, 7, 8.

Curve A of FIG. 6 presents the situation in which the spot has a diameter equal to the thickness of the curve 20 and swings over a radius equal to half the thickness of the line. Graph B is a plot of the signal derivable from the cell 23 as a function of time when the scanning is centered on line 20. In this case the signal is seen to be substantially sinusoidal and to have a frequency equal to twice the frequency of the scanning or back and forth sensing. Graph C is a plot of the signal when the scanning center is at the upper boundary of curve 20. In this case the signal is sinusoidal and has a frequency equal to the scanning frequency. The signal for the scanning center between the center of line 20 and its upper or lower edges or beyond the line is composite including components of the scanning frequency and of twice the scanning frequency. Graph D is a plot of the signal producing a bend in curve 20. In this case the signal is composite, somewhat distorted in waveform and displaced in phase by about 30°.

FIG. 7 shows similar graphs (B, C, D) for the actuation where the scanning spot is of a diameter equal to the thickness of the line and swings over a radius equal to about 1½ times the thickness of the line. In this case a badly distorted waveform is produced.

FIG. 8 shows similar graphs for a spot having a diameter equal to twice the thickness of the line and having a swing equal to half the thickness of the line. In this case the signals are sinusoidal but weaker than for the cases shown in FIGS. 6 and 7.

As shown by FIGS. 6, 7 and 8 the area of the spot and its swing may be properly selected so that the error signal is essentially harmonic or made up of only a few harmonic components. This selection constitutes an important feature of this invention.

In considering FIGS. 6, 7, 8 it should be kept in mind that the curves and graphs are idealized; that is, they correspond to ideal forms of the curve traced and scanning spot which do not exist in actual practice. For example, it is assumed in FIGS. 6, 7, 8 that the scanning spot has a sharp edge and is of equal density throughout; it is also assumed that the curve is sharply defined and has equal density throughout; it is assumed that the optical focus has no inaccuracies. In the actual apparatus the spot and line are not sharply defined and their density varies; the optical system is not optically perfect. These factors and possibly others would tend to smooth out the curves (FIGS. 6, 7, 8) and reduce the harmonic content of the signals to which they correspond. The actual curves into which the above-described factors would convert the curves shown in FIG. 7B, C, D are shown in broken lines on these figures.

FIGS. 6, 7 and 8 are based on a system in which a black curve on a white background is being traced. Consideration should be given to a system in which a white curve on a black background is traced. For example, the curve might be a projected white line on a dark background. In this case a larger spot provides a stronger signal and it has actually been found that a spot of relatively large diameter is advantageous. The spot scanning-circle relationship present in FIG. 8 is advantageous for such apparatus.

In arriving at spot and line diameters conflicting considerations must be weighed. A sharply defined spot and a sharply defined curve do not necessarily lead to higher accuracy in scanning but, in general, will result in less sinusoidal waveforms. The smaller the diameter of the scanning circle relative to the diameter of the scanning spot the more precise the scanning. But because of the inertia of the controlled machine a small scanning circle demands that the tracing speed be low because high speed would cause the scanning to leave the curve entirely.

In apparatus which has been found to operate satisfactorily with a curve having a line width is between .004 and .008 inch in diameter, the spot diameter is about .010 inch and the diameter of the scanning circle is about .030 inch. Cathode-ray oscillograms of the signals produced with this apparatus have shown the signals to be substantially sinusoidal. Perfect focussing was not found to be critically necessary.

In apparatus for scanning a lighter curve on a darker background, the thickness of the curve being between .004 and .008 inch, the diameter of the scanning spot is .040 to .050 inch and the diameter of the scanning circle between .040 and .050 inch. In this case cathode ray oscillograms showed the signal to be substantially sinusoidal.

Figure 3:
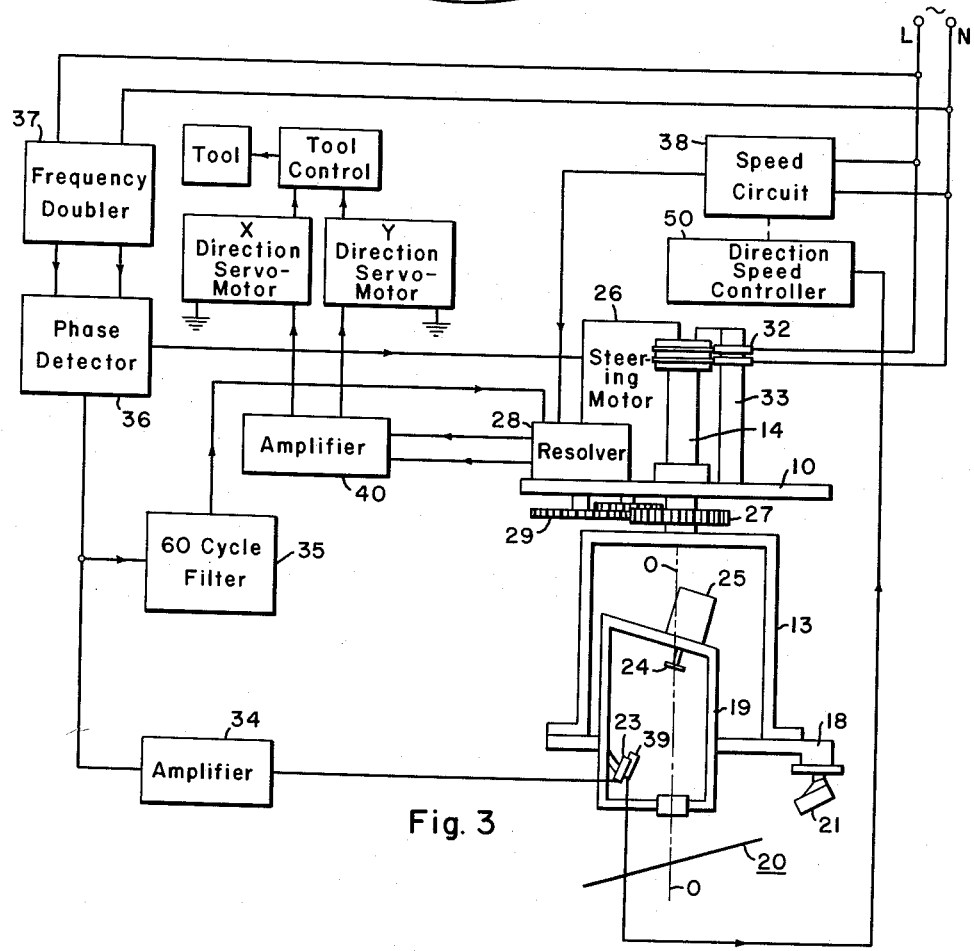
FIGURE 3 is a block diagram of the electrical circuit for the scanning unit.

Referring now also to FIGURE 3, the output from the photocell 23 is fed via an amplifier 34 to a filter 35 which distinguishes between twice the reference frequency corresponding to centering of the scan on curve 20 and other frequencies. The filter 35 may be designed to block a signal of twice the reference frequency and pass signals of all other frequencies (see FIG. 5) but is usually preferably designed to pass a signal of the reference frequency but to reject a signal of any harmonic of the reference frequency, the output from the filter constituting a first control signal and being fed to the resolver 28, which is of the A.C. type and designed to operate at the reference frequency. As the spot rotates it intersects the line twice during each complete rotation and the speed of the motor is such that the resultant sine wave (shown in graphs B of FIGS. 6 through 8) is of twice the reference frequency and is rejected by the filter. If the axis of rotation is displaced from the center of the line the output of the amplifier 34 is as shown in graphs C of FIGS. 6 through 8 and it will be seen that a signal appears of half the frequency of the sine wave in graphs B of FIGS. 6 through 8, i.e. of the same frequency as the reference frequency. This first signal is fed to the resolver, which in turn feeds to X- and Y-component motors the appropriate signals to return the axis of rotation to the center of curve 20.

The output from the amplifier 34 is also fed to a phase sensitive detector 36, which is fed with the output of a frequency doubler 37, the doubler being fed with the reference frequency from power supply terminals L and N. The motor 25 is also supplied from the terminals L and N and is of the phase synchronous type, which means that the rotor will remain in synchronism and also in constant phase relationship with the supply frequency. The effect obtained with the detector 36 is that the optical system may be regarded as having a reference line, and when this line is at a predetermined inclination to the length of the part of the line being scanned, the output from the photocell 23, and thus the output from the amplifier 34, is in synchronism and a predetermined constant phase relationship with the "twice reference frequency" signal supplied to the detector 36. Under these conditions the output from the detector 36, which constitutes a second signal, is insufficient to operate the servomotor 26. If now the inclination of the reference line to the scanned line changes, the phase relationship of the signals fed to circuit 36 changes, and the second signal, which is a D.C. signal, increases to a value such that it is able to operate the servomotor 26, which is of the D.C. type. Thereupon the servomotor 26 will rotate the body 13 until the second signal is again reduced effectively to zero, so that the optical system is maintained with its reference line at the said predetermined inclination. The motion of the body 13 under the action of the servomotor is transmitted by the mechanical coupling to the rotor of the resolver. A third signal proportional to the desired linear velocity of the scanner head to follow the line is derived from a center-tapped variable inductor 38 which is supplied from the terminals L and N and is fed to the resolver to cause the required actuation of the X and Y drive motors.

The scanning head may include a second photocell 39 which is disposed to "view" the scanning path of the spot at a point ahead of the first photocell 23 and to determine through the direction speed controller the speed of the X and Y coordinate drive motors. Thus while the part of the curve being followed is straight both photocells will view the curve and the head can move at maximum speed. When the photocell 39 determines by a change in the light incident thereon that the curve has changed direction it will actuate the circuit 50 to slow down the X and Y motors, thus giving as high tracing speeds as possible without the danger of overshoots at changes of direction. The change in speed that is produced may be in one or more discrete stops, or it may be continuous in dependence upon a continuous change in the signal from the photocell 39. The scanning circuit is shown in detail in FIG. 4. FIG. 4 corresponds to FIG. 3 and insofar as feasible elements illustrated as blocks in FIGURE 3 are surrounded by dashed lines and the whole bears the same designations as the block in FIGURE 3.

It should also be appreciated that stages of amplification shown in FIG. 4 are all shown as triodes for the sake of simplicity, in fact, a stage of amplification generally only represents a necessity for isolation between the components but may give some general indication of the amount of gain required. It should not be implied from this that a single stage of amplification will necessarily be sufficient in a particular application since the number of stages required to obtain the necessary gain depends wholly on the components used. It is also evident that triodes could be replaced by transistors or other amplifying devices.

The actual number of stages required will also depend upon the sensitivity of the photocell, the actual voltage output available from the photocell, the sensitivity of the servomotors driven by the various amplifiers, and of course the available power supplies. With so many variables it is obviously impossible to draw a specific circuit diagram which will apply to other than one very specific situation.

Starting now from photocell designated 23, the output from this photocell is applied to an amplification stage 51. From stage 51 the signal is applied to a phase correction circuit comprising a variable resistor and condenser generally designated 52. The output from the phase correction circuit is applied to a second amplifying stage 53. The output from stage 53 is applied to a gain control 54, the slider of which is connected to the grid of cathode follower 55. Components 51, 52, 53, 54 and 55 comprise amplifier designated 34. One output from cathode follower 55 is applied to notch filter 56 (FIG. 5) which comprises three condensers and three resistors which together form a four terminal network which offers a very high impedance to 120 cycles but permits 60 cycle signals and other frequencies to pass through. The selection of the resistors and condensers is such as to produce the desired characteristic. In typical apparatus which has been found to operate satisfactorily the capacitors 221 and 223 are each 1 microfarad, the capacitor 225 is two microfarads, the resistors 227 and 229 are each 1431 ohms and the resistor 231 is 618 ohms.

The output from cathode follower 57 is applied to one of the windings on the rotor of resolver 28. The other winding on the rotor of resolver 28 is supplied with alternating current. It will be noted that the center-tap transformer 58 provides an alternating current of reversible phase and variable amplitude by means of movements of slider 59 on the potentiometer. The potential on slider 59 is applied to one end of the second coil of the rotor of resolver 28 through contacts 60. Contact 60 is actuated from the direction-speed controller and is connected across a resistor 205. Also note that the primary of transformer 58 is connected to the mains supply designated LN with sinusoidal marking which may supply a reference frequency usually 60 cycles per second.

The outputs from the two stators 201 and 203 of the resolver are utilized as X and Y signals as designated on their terminals. From the X terminal, for example, the signal is taken to the X amplifier shown at the lower portion of the page commencing with "triode 61." This X amplifier is simply an A.C. amplifier; two stages of amplification are shown prior to the power amplifier, the second stage comprising triode 62. The power amplifier is shown in block designated 63. Amplifier 63 may be a magnetic amplifier or it can be suitable high power electronic amplifier. Alternatively the 60 cycle can be converted to D.C. for amplification and then reconverted to A.C. In any event, the output from the power amplifier has a phase and amplitude which is a linear function of the phase and amplitude of the signal at terminal X.

This output is applied to one winding of a two phase servomotor 64, the other winding of the servomotor being supplied from the line LN. On the same shaft as the servomotor is a tachogenerator 65. The output from the tachogenerator is applied to the input of triode 61 together with the signal from terminal X. It should be understood that the tachogenerator 65 is an A.C. tachogenerator whose output is always 60 cycles but the amplitude of the output is proportional to speed and the phase corresponds to direction of rotation of the tachogenerator. The tachogenerator will, of course, have a field supplied from lines LN.

The Y servomotor is similarly connected to the Y stator winding 203 of the resolver 28.

A second output from cathode follower 55 is applied to triode 66 which is a cathode follower for supplying the phase detector circuit 67. This is a standard phase detector similar in construction to a Foster-Seely circuit and requires a reference phase which is supplied from the frequency doubler circuit 37. It will be seen that the frequency doubler generally designated 37 simply consists of a bridge rectifier 68 and a suitable filtering circuit. The output is 120 cycles phase related to the reference frequency supplied on lines LN.

The output from the phase detector is applied to a 120 cycle notch filter as a convenient method of removing 120 cycle from the desired D.C. output. The output therefore which appears across resistor 68 is direct current having an amplitude proportional to the phase difference between the reference signal and the signal from cathode follower 66 and having a polarity dependent upon the direction of this phase relationship. This characteristic is typical of a phase detector.

As a matter of convenience this direct current must be amplified. This is effected conveniently by passing it through a chopper which is shown as a pair of transistors supplied with A.C. from the line LN. It will be noted that there is a phase correction circuit in the A.C. supply to the transistors, this phase correction circuit is designated 69. The output from the chopper which now is 60 cycle alternating current having a phase and amplitude proportional to the polarity and amplitude of the direct current signal appearing on potentiometer 68 is applied to the grid of tube 70. A second and third stage of amplification is shown, namely triode 71 and cathode follower 72. The output from the cathode follower 72 is demoduated in a second phase detector 73 which corresponds exactly in form to the phase detector 67 except that the reference frequency is 60 cycle rather than 120 cycle. Here again a phase correction circuit 74 is provided. The reversible D.C. produced by the demodulator 73 is applied to motor 26.

On the same shaft as motor 26 is a tachometer generator. The output from the tachometer generator appears at terminal 75. Here again the tachometer signal is a 60 cycle signal of amplitude dependent upon the speed of rotation of motor 26 and of phase dependent upon the direction of rotation of motor 26. The output from terminal 75 is applied back to the input of triode 70.

Photocell 39 has an amplifier consisting of two tubes 76 and 77. These together form a high gain amplifier but it will be noted the output from the second tube 77, which is a cathode follower, is coupled back to the input of tube 76 through a notch filter 78. This filter 78 is tuned to 60 cycles. The output from cathode follower 77 is applied to a bridge rectifier 79 and the output applied to the control winding of relay 80 which has front contact 60 connected across resistor 205. Relay 80 actuates contacts 60, which are normally open but are held closed if relay 80 is energized.

Figure 2:
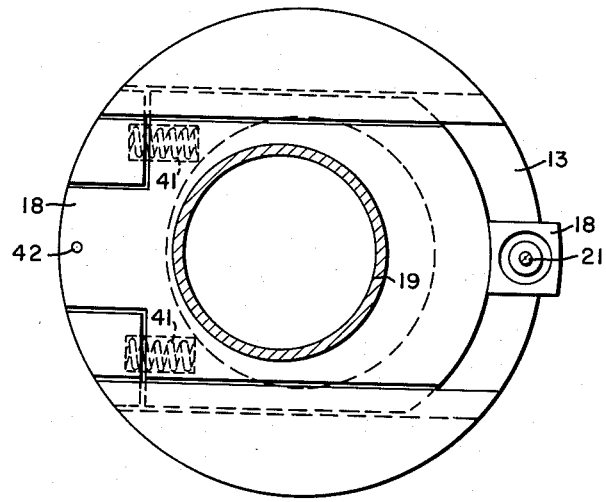
FIGURE 2 is a section taken on the line 2—2 of FIGURE 1.

In operation, it will be understood that a tool such as a gas torch or milling head is connected to the scanning head through the tool control so that the tool will trace out a pattern corresponding exactly to the line drawing. Under some circumstances it may be preferred to have the tool follow a line offset from the line drawing, e.g. by an amount sufficient to permit further machining of the cut-out part. An offset may be produced by an electrical bias introduced into the scanning unit circuit (control circuit of amplifier 51 FIG. 5) but the amount that can be produced is limited by the size of the scanned circle, and in a practical embodiment will be very small. A mechanical method is shown and is the reason for mounting the body 19 on the slide 18. The slide is biased for movement to the right as seen in FIGURES 1 and 2 by two compression springs 41 (FIGURE 2), which cause a pin 42 to be held hard against the face of a cam 43 mounted for rotation on the outer periphery of the tubular body 13. Thus rotation of the cam 43 by a graduated hand wheel 44 to which it is fixed varies the distance which the axis of rotation of the scanned spot is displaced from the longitudinal axis of the scanning head, the graduations on the wheel 44 indicating directly the magnitude of this displacement.

The signal from the photocell 23 is amplified and may be phase adjusted by the phase adjustment 52. This phase adjustment is equivalent to a mechanical motion between the photocell and the mirror. The signal is then further amplified in amplifier 53 and the overall signal to be later utilized is controlled in amplitude by the main gain control 54. A portion of the signal from cathode-follower 55 is passed through the notch filter 56 which eliminates the 120 cycle signal. The remaining component is passed through cathode-follower 57 and applied to one winding 207 of rotor of resolver 28.

The other winding 209 of the rotor of the resolver 28 is supplied with the speed signal from the speed circuit comprising transformer 58 and potentiometer 59. As long as contacts 60 are closed this speed signal is proportional to the position of the slider on the potentiometer. The resultant therefore of these two signals in the rotor of resolver 28 is dependent upon the phase and amplitude of two signals applied and therefore the signals on the X and Y windings of resolver 28 are dependent upon the phase and amplitude of the two signals applied to the rotor and also upon the position of the rotor relative to the X and Y windings. The X signal is therefore a signal composed of the vector in the X direction of the vectorial resultant of a signal representing the error in displacement of the head along a line at right angles to the line being followed, plus the speed signal which is a signal proportional to the desired velocity along the line being followed. It is obvious these two values of signal are at right angles to each other and therefore they are applied to the rotor of the resolver on two windings which are at right angles to each other. Therefore they are always summed in a vectorial manner at 90°. It will be understood that the quality of a resolver is such as to first combine the inputs in its rotor into a single vector quantity representative of the signals supplied to the rotor and then resolve this vector quantity into two vectorial values, in its X and Y windings, at right angles to each other but which represent the vectorial value of the rotor vector with reference to an absolute direction which is the fixed direction of the stator of the resolver.

From the foregoing it should be clear that the X signal is an alternating current signal having an amplitude proportional to the velocity in the X direction with which the head must be moved to resume its position over the line and proceed with a specific tangential velocity along the line and similarly the Y signal is an alternating current signal having an amplitude proportional to the velocity with which the head must proceed in a Y direction to resume its position over the line and proceed to follow the line with a predetermined tangential velocity. If then these two alternating current signals are amplified and applied to servomotors which drive the head in X and Y directions they will cause the head to proceed along the line with a tangential velocity corresponding to the speed signal derived from speed circuit 58 and if the head deviates from the line they will cause the head to move in an X or Y direction as required so that the head moves back over the center of the line along a line at right angles to the instantaneous direction of the line at the point where the head is presently situated. When the output of amplifier 57 is zero the X and Y velocities are so related that the head moves along curve 20 at the speed set by variable resistor 59.

So that the velocity of the head may be tangential to the curve it is necessary that the reference direction of the head, that is, the line defined by two scanning points, CC1—CC2, FIG. 7A, on the surface scanned produced by the head in two predetermined positions of the head displaced by 180°, be parallel to the curve. Therefore a second signal is derived from cathode follower 55 and utilized as a steering signal which causes the head to rotate until the reference line of the head is parallel to the line. This is obtained by deriving from the cathode follower 55 a 120 cycle signal comparing it to 120 cycle reference signal derived from doubler 37, the two being compared in phase detector 36, and amplified therein also. As was pointed out previously, the amplification is carried on as an A.C. signal, is then converted to a direct current signal having a polarity and amplitude proportional to the phase difference and direction of phase difference between the signal derived from cathode follower 55 and frequency doubler 37. This variable value of direct current appears at the output of demodulator 73 and is applied to steering motor 26.

The motor 25 is a phase-synchronous motor (FIGS. 9, 10, 11); that is, a motor in which the instantaneous position of the rotor 200 relative to the frame has a constant unambiguous phase relationship with respect to the periodicity or waves of the exciting supply. Any instantaneous position of the reflector 24 then corresponds to a phase angle of the supply. Thus the two positions of 24 which define the reference line CC1—CC2 also define a reference wave impressed through transformer 67 (FIG. 5) with which the signal impressed through amplifier 66 can be compared.

The addition of the tachometer generator feedback lop in both the steering motor servo loop and the X and Y drive servo loops has only briefly been described. It will be evident, however, that the tachometer generator must be A.C. if the amplification is performed at alternating current. On the other hand, if the whole system is operating with D.C., as may be the case, then the tachometer generator signal may be fed back as D.C. having a value and polarity dependent upon the velocity and direction of rotation of the servomotor.

The circuit shown in conjunction with photocell 39 is a form of amplifier which has very high gain at a specific frequency. By providing a great deal of negative feedback through notch filter 78 the amplifier has virtually no gain at frequencies other than the frequency of the notch filter (60 cycles per second). However, at the frequency of the notch filter the negative feedback is completely, or virtually completely, eliminated and the amplifier has a high gain. Therefore, if a 60 cycle signal appears at the photocell 39 the amplifier has a high gain and the output is applied to the rectifier 79 which in turn energizes relay 80, closing the contact 60. Other frequencies appearing at the photocell, however, will have no effects due to the negative feedback present in the amplifier. Therefore, in order for relay 80 to be energized there must be a 60 cycle signal produced by the photocell 39. This is equivalent to saying there must be a line ahead of the point being scanned. If, however, the line moves rapidly in one direction or the other such that the point directly ahead of the scanning photocell does not bear a line then relay 80 is deenergized, contact 60 opened, and the speed signal is reduced. This in effect means that the follower slows down until such time as the line is ahead of the point being scanned. This is particularly advantageous for going around corners since the corner is indicated before the tracer arrives at the corner. This permits a slow down.

Other notch filter networks of this nature can be introduced having frequency characteristics other than 60 cycle rejection. They would be useful in detecting cross lines or X's on the line which could be used for other control functions such as stopping the apparatus entirely, shutting off gas, causing the apparatus to turn around and retrace its track, and numerous other functions depending upon the nature of the line being traced. In addition, the notch filter 56 which suppresses the 120 cycle component could be replaced by a filter which passes only the 60 cycle component.

It will be noted that in all cases where the 60 cycle reference is being used, there is a phase correction circuit to ensure that no phase errors are introduced.

While the steering servo is shown as D.C. and the XY servos as A.C., these are only examples since both are well known servo systems. One or both could be D.C. and/or one or both could be A.C.

While the apparatus described above operates with a rectangular coordinate system the same operation is possible with a polar coordinate system. With a polar coordinate system the angle through which the optical system is rotated by the servomotor is determined with reference to a radius and not a tangent.

It will be understood that the embodiment described above is a specific example of apparatus embodying the invention and that various alterations and modifications of both the electrical and mechanical elements are possible. For example, if the resolver 28 is of the D.C. type then the filter 35 will be replaced by a phase sensitive detector that is fed with the reference frequency and produces a suitable D.C. signal when the axis of rotation of scanning spot is displaced from the center of the line.

In another embodiment the reference frequency is produced by a tachometer generator driven by the motor 25, so that variations in speed thereof will cause a uniform change of frequency and phase in the reference frequency throughout the system. The use of a phase synchronous motor can be avoided by arranging that the stator of the motor is capable of rotation and coupling the stator to the resolver so that rotations of the former are transmitted to the latter.

In a further embodiment the servomotor 26 and the resolver 28 are mounted separately from the head and a second resolver is provided coupled to the servomotor so that the motor rotor and the rotors of two resolvers all rotate together. The second resolver is then used to maintain the system in phase synchronism, either by driving the motor 25, which is synchronous, or by controlling the reference frequency.

Variations are also possible in the construction of the optical system. For example, it is possible to rotate the photocell in order to produce the required scanning, in which case a mirror may not be required. Again, it is possible to rotate the lens, the photocell remaining stationary, and in a specific embodiment the lens may be mounted eccentrically in a bore in the shaft of the motor 25, the photocell being disposed behind the motor and receiving light transmitted by the lens through the said bore.

It will be understood that the invention has been disclosed with reference to a specific embodiment thereof, and accordingly various modifications and changes may be made to the apparatus described within the scope of the invention as set out in the appended claims.

I claim as my invention:

1. Tracer apparatus for causing a tool to follow a curve comprising curve sensing means, means connected to said sensing means for causing said sensing means to have a back and forth sensing movement at a predetermined frequency about a center in a direction generally transverse to said curve and at the same time advancing said sensing means so as to advance said center in a direction generally along said curve, whereby said sensing means scans successive elements of said curve to produce a first signal, filter means connected to said sensing means for deriving from said sensing means the harmonic component of said first signal having said predetermined frequency, means connected to said filter means and to said sensing means for moving said sensing means with respect to said curve in dependence upon the amplitude of said component in a sense such as to reduce said amplitude, phase detector means connected to said sensing means for deriving from said sensing means a second signal dependent on the phase displacement of said first signal with respect to a parameter bearing a fixed phase relationship to the back-and-forth movement of said sensing means, means responsive to said second signal for deflecting said advance of said sensing means in dependence upon said second signal in a sense such as to reduce said second signal, and means connected to said sensing means for connecting said sensing means to said tool so that said tool follows said sensing means.

2. Tracer apparatus for causing a tool to follow a curve comprising curve sensing means, means connected to said sensing means for causing said sensing means to have a back and forth sensing movement at a predetermined frequency about a center in a direction generally transverse to said curve and at the same time advancing said sensing means so as to advance said center in a direction generally along said curve, whereby said sensing means scans successive elements of said curve to produce first signal, filter means connected to said sensing means for suppressing the harmonic component of said first signal having a frequency twice said predetermined frequency and deriving the residual components of said signal means connected to said filter means and to said sensing means for moving said sensing means with respect to said curve in dependence upon the amplitude of said residual components in a sense such as to reduce said amplitude, phase detector means connected to said sensing means for deriving from said sensing means a second signal dependent on the phase displacement of said first signal with respect to a parameter bearing a fixed phase relationship to the back-and-forth movement of said sensing means, means responsive to said second signal for deflecting said advance of said sensing means in dependence upon said second signal in a sense such as to reduce said second signal, and means connected to said sensing means for connecting said sensing means to said tool so that said tool follows said sensing means.

3. Tracer apparatus for causing a tool to follow a curve on a surface comprising optical means for causing to be sensed the resulting light emitted by a spot scanning back and forth on said surface about a center in a direction generally transverse to said curve at a predetermined frequency, means for at the same time advancing said optical means so as to advance said center in a direction generally along said curve, photo-sensitive means responsive to said resulting light emitted from said surface for producing a signal, the area of said spot and the extent of said scanning being so related to the thickness of said curve that when said center is centered on said curve, said signal is of approximately sinusoidal waveform and of twice said frequency, means connected to said optical means and responsive to said signal for maintaining said center centered on said curve, and means connected to said optical means to be connected to said tool for causing said tool to follow said optical means.

4. Tracer apparatus for causing a tool to follow a curve on a surface comprising optical means for causing to be sensed the resulting light emitted by a spot scanning back and forth on said surface about a center in a direction generally transverse to said curve at a predetermined frequency, means for at the same time advancing said optical means so as to advance said center in a direction generally along said curve, photo-sensitive means responsive to said resulting light emitted from said surface for producing a signal, the area of said spot being so related to the thickness of said curve and to the extent of said scanning that when said center is centered on said curve, said signal is of approximately sinusoidal waveform and of twice said frequency, means connected to said optical means and responsive to the harmonic components of said signal other than said component of twice said frequency and to the phase displacement of said signal with respect to a parameter of fixed phase with respect to said back and forth movement for maintaining said center centered on said curve, and means connected to said optical means to be connected to said tool for causing said tool to follow said optical means.

5. Tracer apparatus for causing a tool to follow a curve on a surface comprising optical means for causing to be sensed the resulting light emitted by a spot scanning back and forth on said surface about a center in a direction generally transverse to said curve at a predetermined frequency, means for at the same time advancing said optical means so as to advance said center in a direction generally along said curve, first photo-sensitive means responsive to said resulting light emitted from first successive elemental areas of said surface as said optical means is advanced for producing a first signal, second photo-sensitive means responsive to said resulting light emitted from second elemental areas of said surface, for producing a second signal, each second elemental area being in advance of a corresponding first elemental area the area of said spot being so related to the thickness of said curve that when said center is centered on said curve said signals are of approximately sinusoidal waveform and of twice said frequency, means connected to said optical means and responsive to said first signal for maintaining said center centered on said curve, means connected to said optical means and responsive to said second signal for reducing the speed of said advancing of said optical means to be reduced substantially on the substantial departure of said optical means from said curve and means connected to said optical means to be connected to said tool for causing said tool to follow said optical means.

6. Tracer apparatus for causing a tool to follow a curve on a surface comprising optical means for causing to be sensed the resulting light emitted by a spot scanning back and forth on said surface about a center in a direction generally transverse to said curve at a predetermined frequency, means for at the same time advancing said optical means so as to advance said center in a direction generally along said curve, first photo-sensitive means responsive to said resulting light emitted from first successive elemental areas of said surface as said optical means is advanced for producing a first signal, means connected to said optical means and responsive to said first signal for maintaining said center centered on said curve, second photo-sensitive means responsive to the resulting light emitted from second successive elemental areas, for producing a second signal, each second elemental area being in advance of a corresponding first elemental area, means connected to said optical means and responsive to said second signal for reducing the speed of said advancing of said optical means to be reduced substantially on the substantial departure of said optical means from said curve and means connected to said optical means to be connected to said tool for causing said tool to follow said optical means.

7. Tracer apparatus for causing a tool to follow a curve comprising curve sensing means, servo means, means connected to said sensing means for causing said sensing means to have a back and forth sensing movement at a predetermined frequency about a center in a direction generally transverse to said curve, means connected to said servo means for at the same time advancing said sensing means so as to advance said center in a direction generally along said curve, whereby said sensing means scans successive elements of said curve to produce a signal, filter means connected to said sensing means for suppressing the harmonic component of said signal having a frequency twice said predetermined frequency and deriving the residual components of said signal, a resolver connected to said sensing means for deriving first and second coordinate signals dependent on the deviation of the center of said sensing from said curve, means connecting said filter means to said servo means for moving said sensing means with respect to said curve in dependence upon the amplitude of said residual components in a sense such as to reduce said amplitude, and means connected to said servo means for connecting said servo means to said tool causing said tool to follow said sensing means in directions corresponding to said coordinate signals.

8. A curve following system comprising a surface bearing a curve to be followed, an optical system for collecting light from a spot on said surface, means connected to said system to scan the spot around a closed path intersecting said curve at a first frequency "$f$," means connected to said scanning means and to said optical system to convert the collected light into an electrical signal representative of the collected light, means connected to said converting means to select from said electrical signal a first control signal of frequency "$f$," and a second control signal of frequency $2"f$," means to provide a third control signal of frequency "$f$" and an amplitude representative of the desired linear curve following velocity, means connected to said providing means and said selecting means to combine said first and third control signals in phase quadrature into a combined signal, a two dimensional servo system, for producing a relative motion of said optical system and said surface, driven by said combined signal to minimize said first control signal, means connected to said scanning means to provide a fourth control signal of frequency $2"f$," having a phase representative of the phase of said scanning means, connected to said last-named providing means and to said selecting means to compare the phase of said second and fourth control signals and utilize the resultant to control the phase of the first frequency in such a manner that a reference line fixed relative to said means to scan the spot is maintained at a constant angle to a tangent to the portion of the curve intersected by the scan.

9. A curve following system comprising a surface bearing a curve to be followed, an optical system for collecting light from a spot on said surface, said system being movable in two dimensions so that it is capable of collecting light from spots each of which encloses a point of a continuum of points defining at least a portion of said surface, said system also being rotatable so as to circularly scan the spot over an area in the neighborhood of each one of said points, means connected to said system to move said system in said two dimensions while it is being rotated to circularly scan the spot over areas intersecting said curve at a first frequency "$f$," means connected to said scanning means and to said optical system to convert the collected light into an electrical signal representative of the collected light, means connected to said converting means to select from said electrical signal a first control signal of frequency "$f$," and a second control signal of frequency $2"f$," means to provide a third control signal of frequency "$f$" and an amplitude representative of the desired linear curve following velocity, means connected to said providing means and said selecting means to combine said first and third control signals in phase quadrature into a combined signal, a two dimensional servo system, for producing a relative motion of said optical system and said surface, driven by said combined signal to minimize said first control signals, means connected to said scanning means to provide a fourth control signal of frequency $2"f$," having a phase representative of the phase of said scanning means, connected to said last-named providing means and to said selecting means to compare the phase of said second and fourth control signals and utilize the resultant to control the phase of the first frequency in such a manner that a reference line fixed relative to said means to scan the spot is maintained at a constant angle to a tangent to the portion of the curve intersected by the scan.

10. A curve following system comprising a surface bearing a curve to be followed, an optical system for collecting light from a spot on said surface, means connected to said system to scan the spot around a closed path intersecting said curve at a first frequency "$f$," means connected to said scanning means and to said optical system to convert the collected light into an electrical signal representative of the collected light, means connected to said converting means to select from said electrical signal a first control signal of frequency "$f$," and a second control signal of frequency $2"f$," means to provide a third control signal of frequency "$f$" and an amplitude representative of the desired linear curve following velocity, means connected to said providing means and said selecting means to combine said first and third control signals in phase quadrature into a combined signal, a two dimensional servo system, for producing a relative motion of said optical system and said surface, said servo system including first means when actuated for producing said relative motion in a first direction and second means when actuated for producing said relative motion in a second direction substantially at right angles to said first direction, means connected to said combining means for resolving said combined signal into two signals in quadrature with each other, means connected to said first means for impressing one of said last-named signals to actuate said first means, means connected to said second means for impressing said other of said last-named signal to actuate said second means, said one and said other of said signals being impressed so that the actuation of said first and second means minimizes said control signal, means connected to said scanning means to provide a fourth control signal of frequency 2"f," having a phase representative of the phase of said scanning means, connected to said last-named providing means and to said selecting means to compare the phase of said second and fourth control signals and utilize the resultant to control the phase of the first frequency in such a manner that a reference line fixed relative to said means to scan the spot is maintained at a constant angle to a tangent to the portion of the curve intersected by the scan.

11. A curve following system comprising a surface bearing a curve to be followed, an optical system for collecting light from a spot on said surface, said system being movable in two dimensions so that it is capable of collecting light from spots each of which encloses a point of a continuum of points defining at least a portion of said surface, said system also being rotatable so as to circularly scan the spot over an area in the neighborhood of each one of said points, means connected to said system to move said system in said two dimensions while it is being rotated to circularly scan the spot over areas intersecting said curve at a first frequency "f," means connected to said scanning means and to said optical system to convert the collected light into an electrical signal representative of the collected light, means connected to said converting means to select from said electrical signal a first control signal of frequency "f," and a second control signal of frequency 2"f," means to provide a third control signal of frequency "f" and an amplitude representative of the desired linear curve following velocity, means connected to said providing means and said selecting means to combine said first and third control signals in phase quadrature into a combined signal, a two dimensional servo system, for producing a relative motion of said optical system and said surface, driven by said combined signal to minimize said first control signal, means connected to said scanning means to provide a fourth control signal of frequency 2"f," having a phase representative of the phase of said scanning means, connected to said last-named providing means and to said selecting means to compare the phase of said second and fourth control signals and utilize the resultant to rotate said optical system so as to control the phase of the first frequency in such a manner that a reference line fixed relative to said means to scan the spot is maintained at a constant angle to a tangent to the portion of the curve intersected by the scan.

12. An optical system for determining the light emissivity of elemental portions of a surface, including light-responsive sensing means, and motor means connected to said sensing means for rotating said sensing means so that during each complete rotation of said sensing means said sensing means responds to the light emitted from an area of said surface encircling the point about which said sensing means is rotated, said motor means being of the phase-synchronous type.

13. An optical scanning system for scanning a curve on a surface including light-responsive sensing means, and phase-synchronous motor means for rotating said sensing means so that during each rotation of said sensing means said sensing means senses an elemental area including an elemental portion of said curve.

14. Apparatus for controlling the operation of a tool from guiding means including a configuration which the tool is to follow, the said apparatus including scanning means for scanning successive elements of said configuration at a predetermined first frequency and for producing a first signal dependent on the position of the element of the configuration being scanned, following means connected to said scanning means and to be connected to said tool for moving said tool in accordance with said scanning means, means connected to said scanning means for deriving from said signal the harmonic component of said signal which has a second frequency which is a submultiple of said first frequency, first means for producing a first reference signal in space quadrature with said component, means connected to said producing means and to said deriving means for causing said scanning means to move in accordance with the resultant of the amplitude of said component and the amplitude of said reference signal in such a sense as to reduce said amplitude, second means for producing a second reference signal having a fixed phase with respect to said scanning movement, means connected to said second producing means and to said scanning means for deriving a second signal dependent on the phase displacement of said first signal with reference to said second reference signal and means connected to said second signal deriving means for producing an angular displacement in said scanning means dependent on the amplitude of said second signal and in such a sense as to reduce said second signal.

15. Apparatus for controlling the operation of a tool from guiding means including a configuration which said tool is to follow, the said apparatus including scanning means for scanning successive elements of said configuration at a predetermined first frequency and for producing a first signal dependent on the position of the element of the configuration being scanned, following means connected to said scanning means and to be connected to said tool for moving said tool in accordance with the movement of said scanning means, means connected to said scanning means for deriving from said signal the harmonic component of said signal which has a second frequency which is a submultiple of said first frequency, means connected to said deriving means for causing said scanning means to move in accordance with the amplitude of said component in such a sense as to reduce said amplitude, means for producing a reference signal having a fixed phase with respect to said scanning movement, means connected to said last-named producing means and to said scanning means for deriving a second signal dependent on the phase displacement of said first signal with reference to said reference signal, and means connected to said last-named deriving means for producing an angular displacement in said scanning means dependent on the amplitude of said second signal and in such a sense as to reduce said second signal.

16. Apparatus for causing a tool to follow a curve which comprises scanning means for progressively scanning each successive element of said curve to produce a first signal by moving sensing means back and forth in a direction generally transverse of said curve about a center at a first frequency, means connected to said scanning means for deriving from said first signal the harmonic component of said signal having a second frequency equal to a submultiple of said first frequency, means connected to said deriving means for moving said center in dependence upon the amplitude of said component in such a sense as to reduce said component, means for producing a reference signal having a fixed phase displacement with respect to said scanning movement, additional deriving means connected to said scanning means and to said producing means for deriving from said first signal a second signal dependent on the phase displacement between said first signal and said reference signal and means connected to said additional deriving means for deflecting the direction of said scanning in dependence upon the amplitude of said second signal in a sense such as to reduce said last-named amplitude, and means connected to said scanning means for causing said tool to follow the movement of said scanning means.

17. Apparatus for causing a tool to follow a curve which comprises scanning means for progressively scanning each successive element of said curve to produce a first signal by moving sensing means back and forth in a direction generally transverse of said curve about a center at a first frequency and at the same time advancing said sensing means so as to advance said center in a direction generally along said curve at a predetermined velocity, advance sensing means for sensing a bend in said curve in advance of said scanning, means connected to said sensing means and to said scanning means for reducing said advancing to a velocity lower than said predetermined velocity on the occurrence of said bend, means connected to said scanning means for deriving from said first signal the harmonic component of said signal having a second frequency equal to a submultiple of said first frequency, means connected to said scanning means and to said deriving means for moving said center in dependence upon the amplitude of said component in such a sense as to reduce said component, means for producing a reference signal having a fixed phase displacement with respect to said scanning, additional deriving means connected to said producing means and to said scanning means for deriving from said first signal a second signal dependent on the phase displacement between said first signal and said reference signal, and means connected to said additional deriving means for deflecting the direction of said advancing in dependence upon the amplitude of said second signal in a sense such as to reduce said last-named amplitude, and means connected to said scanning means for causing said tool to follow the movement of said scanning.

18. Apparatus for causing a tool to follow a curve which comprises first scanning means for progressively scanning each successive element of said curve to produce a first signal by moving first sensing means back and forth in a direction generally transverse to said curve about a first center and at the same time advancing said sensing means so as to advance said center in a direction generally along said curve at a predetermined velocity, means connected to said scanning means and responsive to said first signal moving said sensing means in a direction to center said first center on said curve, second scanning means additionally progressively scanning each successive element of said curve in advance of said first scanning means to produce a second signal by moving second scanning means back and forth in a direction generally transverse to said curve about a second center and at the same time advancing said second scanning means to advance said second center at said predetermined velocity, and means connected to said second scanning means and to said first scanning means and responsive to said second signal for reducing said velocity on the departure of the scanning path of said additional scanning means substantially from said curve.

19. Tracer apparatus for causing a tool to follow a curve comprising sensing means, means connected to said sensing means for causing said sensing means to have a back and forth sensing movement at a predetermined frequency about a center in a direction generally transverse to said curve and at the same time advancing said sensing means so as to advance said center generally along said curve, whereby said sensing means scans successive elements of said curve to produce a periodic signal the frequency content of which is dependent on the displacement of said center laterally from said curve and the phase of which is dependent on the departure of the direction of said scanning from said curve, means connected to said sensing means responsive to the frequency content of said signal for maintaining said center along said curve, means connected to said sensing means responsive to said phase of said signal for maintaining the direction of said scanning parallel to said curve, and means connected to said sensing means for causing said tool to follow said sensing means.

20. Phase comparison apparatus to be energized from a source of commercial frequency comprising means for deriving a first variable signal of a frequency of twice said commercial frequency and of variable phase, means to be connected to said source for deriving from said source a first standard signal having a frequency of twice said commercial frequency and of fixed phase, phase detector means connected to said first-signal deriving means and to said first standard-signal deriving means for deriving a first direct-current signal having an amplitude and polarity dependent on the magnitude and sense respectively of the phase displacement of said first signal relative to said first standard signal, means connected to said phase-detector means for converting said direct-current signal into an alternating-current signal having an amplitude dependent on said magnitude and a phase dependent on said polarity and having a frequency equal to said commercial frequency, means for deriving a second standard signal having a frequency equal to said commercial frequency and a fixed phase, and means connected to said alternating-current-signal deriving means and to said second-standard-signal deriving means for deriving a second direct-current signal having a magnitude and polarity respectively dependent on the amplitude and phase of said alternating-current signal.

21. Phase comparison apparatus to be energized from a source of commercial frequency comprising means for deriving a first variable signal of a frequency of twice said commercial frequency and of variable phase, means to be connected to said source for deriving from said source a first standard signal having a frequency of twice said commercial frequency and of fixed phase, phase detector means connected to said first-signal deriving means and to said first-standard-signal deriving means for deriving a first direct-current signal having an amplitude and polarity dependent on the magnitude and sense respectively of the phase displacement of said first signal relative to said first standard signal, means connected to said phase-detector means for converting said direct-current signal into an alternating-current signal having an amplitude dependent on said magnitude and a phase dependent on said polarity, and having a frequency equal to said commercial frequency, alternating-current amplifier means having output means connected to said connecting means for amplifying said alternating-current signal to produce an amplified signal at said output means, means for deriving a second standard signal having a frequency equal to said commercial frequency and a fixed phase, and means connected to said output means and to said second-standard-signal deriving means for deriving a second direct current signal having a magnitude and polarity respectively dependent on the amplitude and phase of said amplified alternating-current signal.

22. Apparatus for causing a tool to follow a curve which comprises scanning means for progressively scanning each successive element of said curve to produce a first signal by moving sensing means back and forth in a direction generally transverse of said curve about a center at a first frequency, said sensing means describing a geometric figure as distinct from a line during each cycle of said back and forth movement, means connected to said scanning means for deriving from said first signal the harmonic component of said signal having a second frequency equal to a submultiple of said first frequency, means connected to said deriving means for moving said center in dependence upon the amplitude of said component in such a sense as to reduce said component, means for producing a reference signal having a fixed phase displacement with respect to said scanning movement, additional deriving means connected to said scanning means and to said producing means for deriving from said first signal a second signal dependent on the phase displacement between said first signal and said reference signal and means connected to said additional deriving means for deflecting the direction of said scanning in dependence upon the amplitude of said second signal in a sense such as to reduce said last-named amplitude, and means connected to said scanning means for causing said tool to follow the movement of said scanning means.

References Cited in the file of this patent

UNITED STATES PATENTS 2,499,178     Berry et al. _____ Feb. 28, 1950